Patented Apr. 11, 1939

2,154,203

UNITED STATES PATENT OFFICE 2,154,203

MANUFACTURE OF SHAPED ARTICLES OF HIGHLY POLYMERIC COMPOUNDS

Otto Hauffe, Eilenburg, Germany, assignor to Deutsche Celluloid-Fabrik, Eilenburg, Germany No Drawing. Application November 10, 1936, Serial No. 110,115. In Germany November 13, 1935

6 Claims. (Cl. 18—55)

My present invention relates to a process of manufacturing shaped articles of highly polymeric compounds.

One of its objects is an improved process of manufacturing shaped articles from thermoplastic polymers of the vinyl group. Further objects will be seen from the detailed specification following hereafter.

It has been proposed to work up vinyl polymerizates with solvents in the manner used in the so-called Celluloid processes. In this proceeding the polymerizates lose on drying only a definite percentage of the added quantity of solvent, the absolute amount so lost depending on the chemical constitution of the polymerizate, on the solvent and on the drying operation. In the case of polyacrylic acid-methyl ester or the mixed polymerization product from vinyl chloride and acrylic acid methyl ester, for example, at most 97–98 per cent of the solvent is separated when vacuum drying is applied. This residual solvent retained in the polymerizate influences the properties of the latter so profoundly that its practical application becomes difficult and often impossible. When it is attempted to remove this residual solvent by a prolonged drying at a high temperature the material is damaged so that the plastic mass is rendered useless.

It has further been proposed to remove residues of solvents which are retained from plastic masses from pyroxylin by treating the said masses with a medium which is a non-solvent for the pyroxylin, but which is miscible with the solvent liquid retained in the plastic. This method could not be successfully applied to the treatment of plastic masses from vinyl resins.

This invention relates to a process for working up vinyl polymerizates to plastic masses of high value wherein there is used a solvent or mixture of solvents which can easily be decomposed into components having no solvent power for the highly polymeric compounds. It has been unexpectedly found that such a decomposition of the residual solvent which cannot be separated by drying considerably improves the properties of the polymerizate; whereas, for example, the softening point of a sheet made by the Celluloid process from a mixed polymerizate from vinyl chloride and acrylic acid ester (80:20) is about 40–45° C. and even after a month's drying is not increased, the strength on the other hand being continuously diminished by this drying, there may be obtained by this invention process from the same polymerizate a crude plastic of any form, such as sheets, plates, rods or tubes which, after the decomposition of the residual solvent and a short final drying is found to have a raised softening point of, for example, 62° C. and an essentially improved strength. Such a crude plastic easily finds a many-sided commercial application.

The invention is illustrated by the following examples, in which the parts are by weight:—

(1) 100 parts of a mixed polymerizate of 80 parts of vinylchloride and 20 parts of acrylic acid-methyl ester are plastified by means of 25 parts of methyl acetate at 40–50° C. in a kneading machine and then smoothed on normal Celluloid rollers at about the same temperature, and cooked in a block press. From this block sheets of 0.1–2 mm. thickness are produced which are finally dried in a warm air chest at 35–40° C. Hereby about 97 per cent of the incorporated methyl-acetate is lost. For a sheet of 0.5 mm. thickness 5 days are necessary for attaining this. The softening point of such a sheet is 42° C. The sheet is now immersed for 24 hours in an aqueous potash solution of 5 per cent strength at 40–45° C. The methyl acetate is decomposed into methanol and acetic acid. The products of this decomposition may easily be washed out by immersing the sheet in water, preferably, but not necessarily, at a raised temperature. After further drying the sheet has a softening point of 62° C. Instead of the aqueous potash lye alcoholic lye can be used.

(2) 100 parts of polyvinyl chloride are plastified with 50 parts of methyl acetate at 40–50° C. in a kneading machine and further worked up as described in Example 1. From the block are cut rods of 2–10 mm. diameter and these are first dried in air at 36–40° C. The residual methyl acetate not removed by this drying lowers the softening point to about 50° C.; it is now saponified by boiling water in the course of 10–12 hours. By repeated treatment with hot water the last traces of the acetic acid and methanol produced by the saponification are removed and the rods are finally dried at 40–50° C. The softening point has been raised to 78° C. by this removal of residual solvent.

(3) 100 parts of chlorinated polyvinyl chloride or a mixture of polyvinyl chloride and chlorinated polyvinyl chloride, in any proportion, are plastified with 25–50 parts of ethyl formate at 40–45° C., worked up as described in Example 1 into sheets and then dried in air until the ethyl formate has been reduced to about 5 per cent. Finally the sheets which have a softening point of 48° C. are immersed in water of 50–60° C. for 12 hours, whereby the ester is decomposed into alcohol and formic acid. Both these products may easily be removed by a short treatment with water of 30–50° C. After a further drying the sheets have a softening point of 72° C.

(4) A crude mass of the mixed polymerizate made as described in Example 1 with the use of ethyl-acetate is formed into tubes in a tube-press of any desired diameter. These tubes are now dried by immersion in a caustic soda lye of 5–10 per cent strength, preheated to 40–50° C. The solution, if desired being allowed to flow in a slow stream through the immersion tank. When the saponification is complete, as may be ascertained by titration of the lye, the tubes are washed with water of the same temperature as was used in the saponification or another temperature so as to remove the alcohol and acetic acid and are finally dried for some time. The tubes then have a softening point of 65–68° C. The process of this example may be applied in a similar manner for the production of sheets, plates and rods.

(5) 100 parts of the mixed polymerizate from 85 parts of vinyl chloride and 15 parts of acrylic acid ester of a higher alcohol having more than 4 carbon atoms in the alcohol molecule, are plastified with 25–50 parts of acetal at 50–90° C. in a kneading machine, and the product is worked up as described in any one of the preceding examples to plates, sheets or rods. By drying in air about 90–95 per cent of the acetal is removed and the amount retained is saponified by immersion of the mass in aqueous, preferably 2N hydrochloric acid. The products of decomposition of the solvent are separated by washing and drying. By this treatment the softening point is raised by about 20° C.

(6) 100 parts of one of the polymerizates named in the preceding examples are plastified with a mixture of acetone, benzene and alcohol in the ratio 2:2:1 in a kneading machine at a suitable temperature and are then worked up, as described in any one of the preceding examples, to form sheets, plates, rods or tubes. After air-drying about 80–95 per cent of the mixture of solvents has been removed, the residual solvent in the polymeride is decomposed by treatment at 50–60° C. with an aqueous hydroxylamine solution of 10 per cent strength. Washing and drying in the air-bath follow. The softening point of a mixed polymerizate made as described in Example 1 and treated as described in this example is raised from 45° C. to 62° C. With this is associated an increase of strength.

(7) 100 parts of one of the polymerizates named in the preceding examples are plastified with a mixture of isobutyron, benzene and methanol in the ratio 2:2:1 in a kneading machine at 70° C. and the plastified mass is made into sheets, plates, rods or tubes as described in one of the preceding examples. For drying at first 80 to 95 per cent of the solvent mixture are evaporated by drying in the air and the rest of solvent retained by the polymeric compound is then split by treatment with hydrazine sulfate in an aqueous sodium alkaline solution. After washing with water the material is dried in the air.

With the plastic masses may be incorporated filling materials, pigments, soluble dyestuffs, color lakes and also softeners up to a certain amount.

Sheets which have been made by this invention may be polished in known manner by pressure between highly polished nickel plates and applied on a flat surface of any kind, such as that of a textile, card, paper or the like, in which operation a simultaneous subjection to a hot-pressing at a temperature above the softening point of the polymerizate which has been used is of advantage for the mechanical properties. The sheets may also easily be given a matt surface. They may also be used for making receiving and transmitting sound diaphragms. Their highly insulating properties ensure for them a wide application in electrical engineering. Moreover, these sheets are suitable as carriers for photographic layers, in connection with which it may be remarked that the process may also be used in the manufacture of sheets by the film-casting process or by the drum or band machine. The crude plastic may be used as a packing material, as a sticky intermediate layer for making safety glass or the like. Moreover, the plates, rods and tubes have many applications in the production of useful articles of any kind, such as toys, ornaments or the like.

Other plastic masses, for instance, those from styrene or from highly polymeric bodies of the vinyl group made by condensation with carbonyl compounds may be worked up by the invention in manner similar to that described for the vinyl polymerizates.

It has also been found that it is possible to free in similar manner from retained residues of solvent finished or intermediate products from the highly polymeric bodies for which a solvent has been added in the manufacture for the purpose of working them up by the spraying or casting methods, or, as has been proved advantageous, in a hot-pressing or rolling process.

In the claims following hereafter the expression "a thermoplastic non-hardening polymeric vinyl compound" includes polymerized vinyl compounds, mixed polymerizates of the vinyl group and highly polymeric bodies of the vinyl group made by condensation with carbonyl compounds.

What I claim is:

1. A process of producing shaped articles from a mixed polymerizate of vinyl chloride and acrylic acid methyl ester, which comprises plastifying said mixed polymerizate by means of methyl acetate, molding said plastic mass, drying said mass, immersing said mass into an alkaline solution until saponification of the remaining methyl acetate is complete, and washing said mass with water.

2. A process of producing shaped articles from a mixture of polymerized vinyl chloride and chlorinated polymerized vinyl chloride, which comprises plastifying said mixture by means of ethyl formate, molding said plastic mass, drying said mass, immersing said mass into water until saponification of the ethyl formate is complete, and washing said mass with water.

3. A process of producing shaped articles from a mixed polymerizate of vinyl chloride and an acrylic acid ester of an alcohol having more than 4 carbon atoms, which comprises plastifying said mixed polymerizate by means of acetal, molding said plastic mass, drying said plastic mass, immersing said mass into an acid aqueous solution until saponification of the acetal is complete, and washing said mass with water.

4. A process of producing shaped articles from a thermoplastic non-hardening polymeric vinyl compound, which comprises plastifying said compound with a solvent capable of being decomposed into components which are not solvents for said compound, molding said plastic mass, drying said molded mass, decomposing said solvent liquid into components which are not solvents for said polymeric vinyl compound, and washing out the products of decomposition by means of a non-solvent for said polymeric compound.

5. A process of producing shaped articles from a thermoplastic non-hardening polymeric vinyl compound, which comprises plastifying said compound with a solvent capable of being split by saponification into components which are not solvents for said compound, molding said plastified mass, drying said molded mass, saponifying said solvent, and washing out the saponification products by means of a non-solvent for said polymeric compound.

6. A process of producing shaped articles from a thermoplastic non-hardening polymeric vinyl compound, which comprises plastifying said compound in a solvent capable of being split into components which are not solvents for said compound by formation of an addition product, molding said plastified mass, drying said molded mass, treating said molded mass with a compound capable of forming with at least one of said solvent components an addition compound, and washing out the conversion products of said solvent by means of a non-solvent for said polymeric compound.

OTTO HAUFFE.